(12) United States Patent
Yanagisawa

(10) Patent No.: US 6,538,977 B1
(45) Date of Patent: Mar. 25, 2003

(54) MECHANISM FOR ADJUSTING RADIATING DIRECTION OF LIGHT EMITTED FROM LASER LIGHT SOURCE IN OPTICAL PICKUP DEVICE

(75) Inventor: Katsushige Yanagisawa, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 202 days.

(21) Appl. No.: 09/656,717

(22) Filed: Sep. 7, 2000

(30) Foreign Application Priority Data

Sep. 7, 1999  (JP) ............................. 11-252579

(51) Int. Cl.⁷ ............................................. G11B 7/135
(52) U.S. Cl. ........................ 369/121; 359/813; 359/822
(58) Field of Search .................... 369/244, 121; 359/811, 823, 813, 822

(56) References Cited

U.S. PATENT DOCUMENTS

| | | | | |
|---|---|---|---|---|
| 4,498,737 A | * | 2/1985 | Doggett | 359/641 |
| 4,827,485 A | * | 5/1989 | Scerbak et al. | 372/101 |
| 5,283,802 A | * | 2/1994 | Hsiung | 372/107 |
| 5,351,330 A | * | 9/1994 | Jongewaard | 385/90 |
| 5,689,378 A | * | 11/1997 | Takashima et al. | 359/811 |
| 5,878,073 A | * | 3/1999 | Wu | 359/829 |
| 6,025,963 A | * | 2/2000 | Hippenmeyer et al. | 359/811 |
| 6,092,728 A | * | 7/2000 | Li et al. | 235/454 |
| 6,178,155 B1 | * | 1/2001 | Ueda et al. | 369/244 |
| 6,381,207 B1 | * | 4/2002 | Ryoo et al. | 369/121 |

FOREIGN PATENT DOCUMENTS

| | | | |
|---|---|---|---|
| JP | 5-81693 | * | 4/1993 |
| JP | 2835778 | | 10/1998 |
| JP | 11-63996 | * | 3/1999 |

* cited by examiner

Primary Examiner—Brian E. Miller
(74) Attorney, Agent, or Firm—Sughrue Mion, PLLC

(57) ABSTRACT

An attachment portion 20 for a laser diode 1 is formed on a frame 2 of an optical pickup device. The attachment portion 20 includes a pair of inner peripheral faces 233 and 234 to which an outer peripheral face 103 of a circular stem 101 of the laser diode 1 can be press-fitted, and a pair of convex faces 241 and 242 rockably supporting an annular end face 104 of the stem 101 around a rocking center line L1. When the laser diode 1 is press-fitted and is then rocked around the rocking center line L1, the intensity distribution center of a laser beam 11 emitted from the laser diode 1 can be coincident with an optical axis L of an optical system.

3 Claims, 4 Drawing Sheets

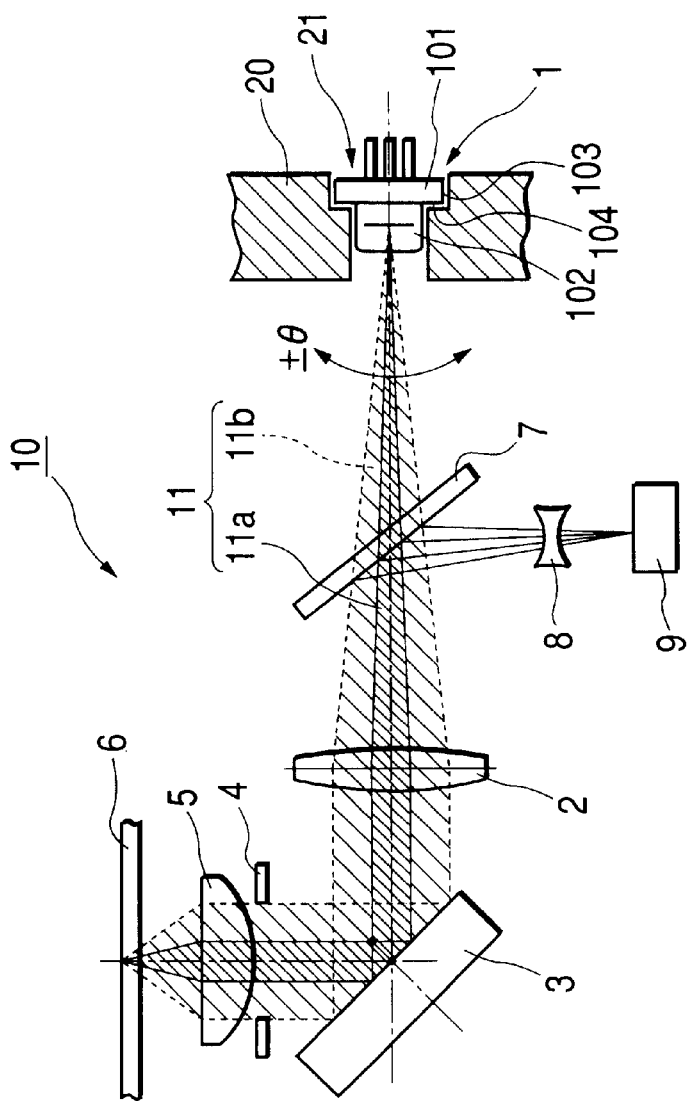
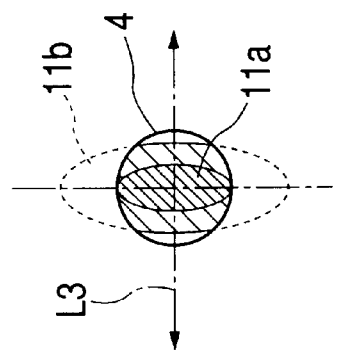
FIG. 1A
FIG. 1B

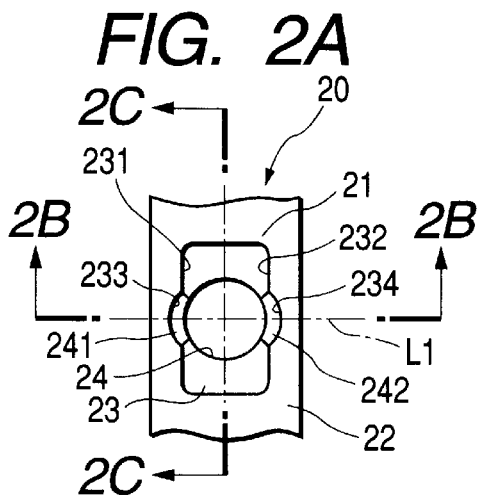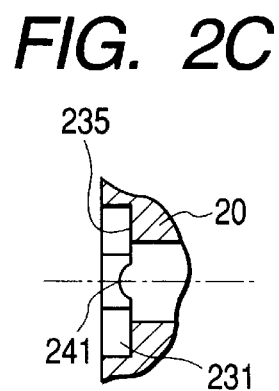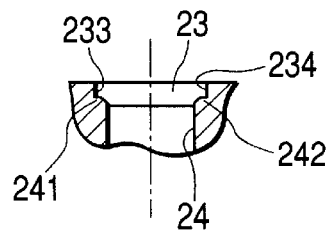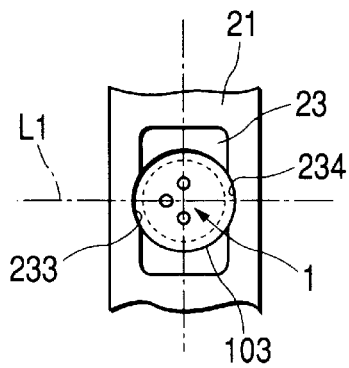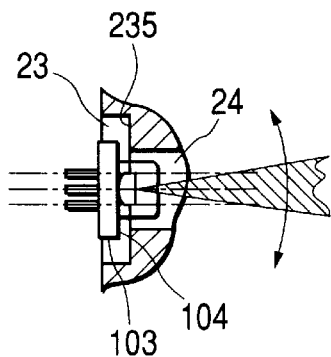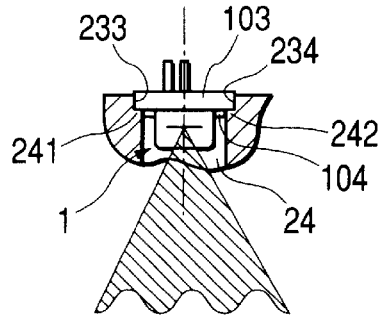

MECHANISM FOR ADJUSTING RADIATING DIRECTION OF LIGHT EMITTED FROM LASER LIGHT SOURCE IN OPTICAL PICKUP DEVICE

BACKGROUND OF THE INVENTION

The present invention relates to an optical pickup device for carrying out reproduction of an optical recording medium such as a CD, and more particularly to an optical pickup device which can cause an intensity distribution center of a laser beam emitted from a laser beam source to be coincident with an optical axis of an optical system with high precision.

An optical system of an optical pickup device for carrying out reproduction and recording for an optical recording medium such as a CD generally comprises a laser diode 1, a collimate lens 2 for causing a laser beam 11 emitted from the laser diode 1 to be a parallel beam, an uprighting mirror 3 for uprighting the parallel laser beam, and an objective lens 5 for converging, as an optical spot, the laser beam uprighted by the mirror 3 and led on a recording face of an optical disk 6 through an aperture 4 as shown in FIG. 4A. A laser return beam reflected by the optical disk 6 is returned through the same path and is led to a photodetector (not shown) via a half mirror (not shown) provided between the collimate lens 2 and the laser diode 1 so that reproduction information included therein is detected.

An intensity distribution of the laser beam emitted from the laser diode 1 almost represents a Gaussian distribution and has an ellipsoidal shape 11b with maximum and minimum radiation angles of $\theta_v$ and $\theta_h$ in an orthogonal direction as shown in FIG. 5. In general, a central portion of the distributed light 11a shown in an oblique line is utilized through the aperture 4.

As shown in FIGS. 4A and 4B, the center of the intensity distribution of the laser beam 11 should be coincident with an optical axis L of an optical system which passes through an optical axis of an objective lens constituting the optical system. If the center is not coincident with the optical axis L, for example, if the radiation angle of the central distributed light 11a is shifted by $\theta$ from the optical axis of the optical system as shown in FIGS. 4C and 4D, the intensity distribution center on the aperture 4 of the objective lens is shifted by $\Delta_x$. As a result, there are drawbacks that a distortion is generated on an optical spot formed on the optical disk, an offset is generated through a push-pull method, a Wobble S/N ratio is deteriorated and lens shift characteristics are imbalanced.

As shown in FIG. 6, a shift of the intensity distribution center of the laser beam 11 in a direction (L3) toward a smaller distribution of the light quantity (FIG. 6A) has a greater influence than a shift in a direction (L4) toward a large distribution of the light intensity (FIG. 6B).

The intensity distribution center of the laser beam is thus shifted from the optical axis of the optical system due to precision of parts of the laser diode or an assembling error. In order to eliminate such a shift of the optical axis, conventionally, Japanese Patent No. 42835778 has disclosed a mechanism for causing the intensity distribution center of the laser beam to be coincident with an optical axis of an optical system by attaching a laser diode to a device frame through an adjusting table and adjusting an angle of a plane in the adjusting table where the laser diode is to be attached with respect to the optical axis of the optical system, for example.

In such a shift adjusting method, however, it is necessary to provide the adjusting table for the laser diode separately. Consequently, a great deal of time and labor is required for the assembly and a cost is increased. Furthermore, the dimension of the device is increased and the structure thereof is also complicated.

SUMMARY OF THE INVENTION

In consideration of such a respect, it is an object of the invention to propose an optical pickup device capable of causing the intensity distribution center of a laser beam to be coincident with an optical axis of an optical system with a simple structure.

In order to achieve the above object, according to the present invention, there is formed on a device frame an attachment portion to which a laser diode can be rockably attached. Accordingly, it is possible to carry out such adjustment as to cause the intensity distribution center of the laser beam emitted from the laser diode to be coincident with the optical axis of the optical system without using another member such as the above laser diode adjusting table.

BRIEF DESCRIPTION OF THE DRAWINGS

In the accompanying drawings:

FIGS. 1A and 1B are a diagram showing a schematic structure of an optical system of an optical pickup device to which the present invention is applied and a diagram illustrating the relationship between an aperture of an objective lens and the distribution of a laser beam 11;

FIGS. 2A to 2C are a partial plan view showing a portion where a laser diode formed on a frame of the optical pickup device in FIG. 1 is to be attached and partial sectional views taken along an orthogonal plane;

FIGS. 3A to 3C are a plan view showing a state in which the laser diode is press-fitted into the attachment portion of FIG. 2 and partial sectional views taken along an orthogonal plane;

DETAILED DESCRIPTION OF THE PREFERRED EMBODIMENTS

Figure 4A:
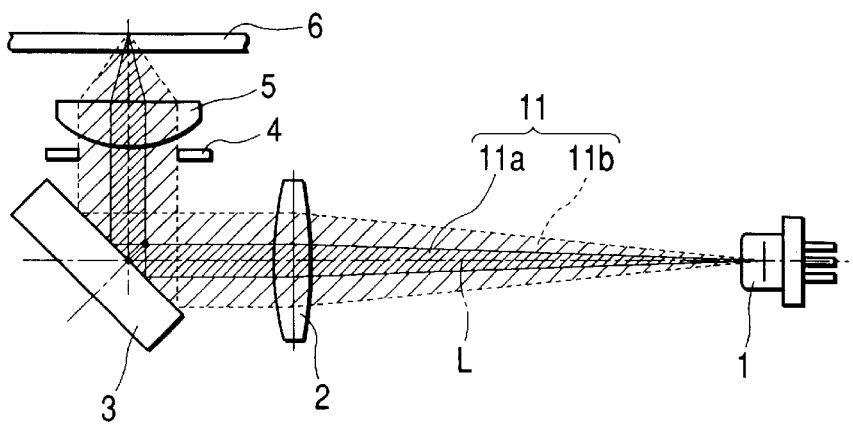
FIGS. 4A and 4B are diagrams showing a state in which an intensity distribution center of a laser beam is coincident with an optical axis of the optical system of the optical pickup device.
Figure 4B:
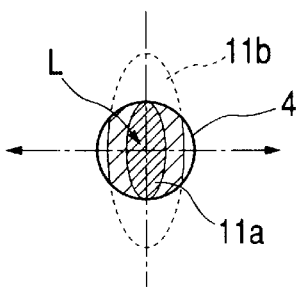
Figure 4C:
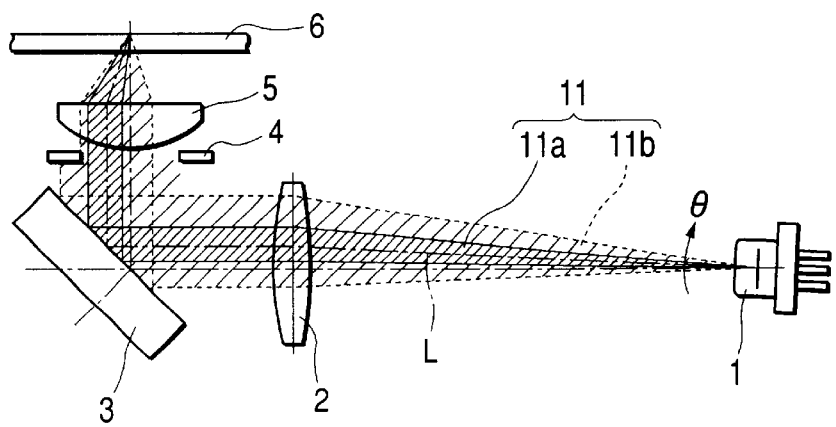
FIGS. 4C and 4D are diagrams showing a state in which the intensity distribution center is deviated from the optical axis.
Figure 4D:
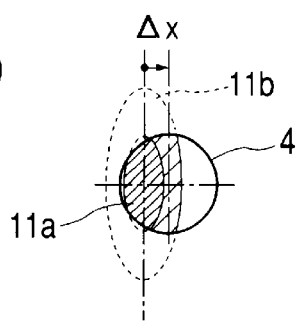

An optical pickup device according to an embodiment of the invention will be described below with reference to the drawings.

FIG. 1 shows the configuration of an optical system of an optical pickup device according to the embodiment. As shown, an optical system of an optical pickup device 10 has a laser diode 1, a half mirror 7 for reflecting a part of a laser beam 11 emitted therefrom, a collimate lens 2 for causing the reflected laser beam 11 to be a parallel beam, an uprighting mirror 3 for uprighting the laser beam to be the parallel beam, and an objective lens 5 for converging, as an optical spot, the laser beam uprighted by the mirror 3 and led through an aperture 4 on a recording face of an optical disk 6.

The laser return beam reflected by the optical disk 6 is returned through the same path, is led to a photodetector 9 via a sensor lens 8 through the half mirror 7 provided between the collimate lens 2 and the laser diode 1 so that reproduction information included therein is detected.

Figure 5:
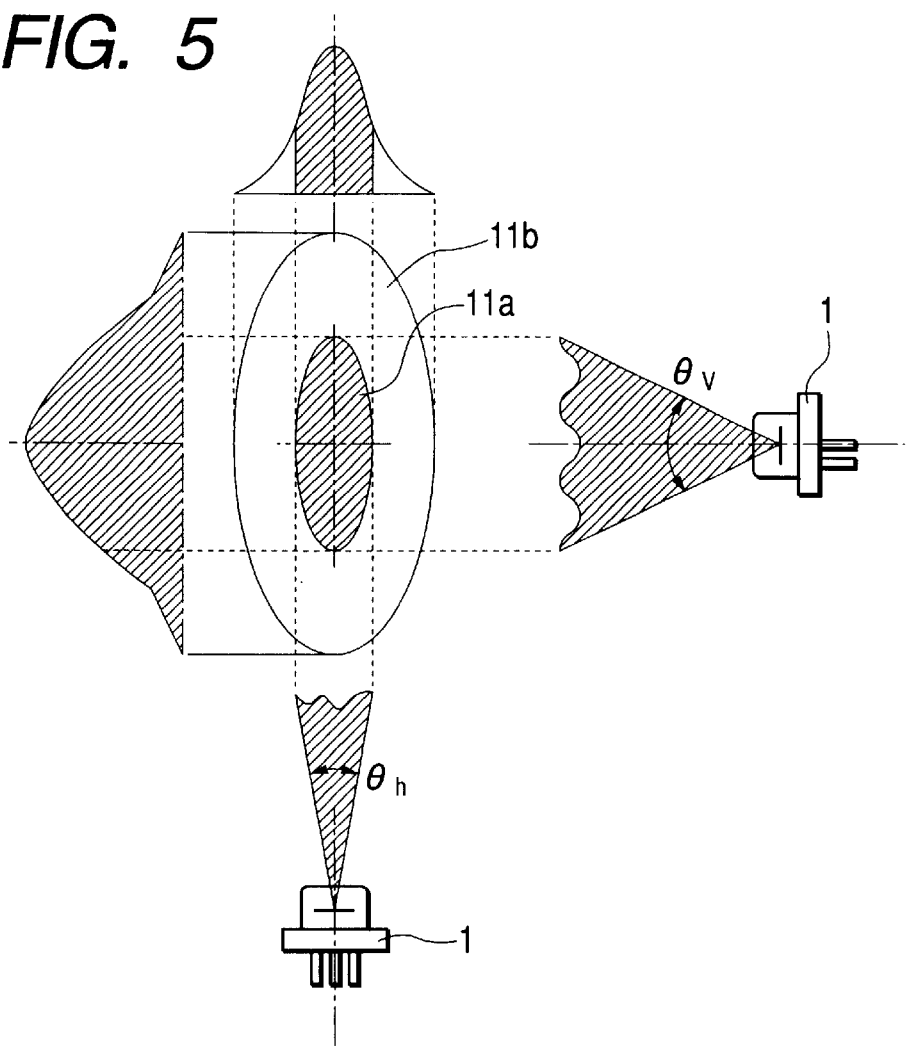
FIG. 5 is a diagram illustrating a state of the intensity distribution of the laser beam emitted from the laser diode.

The laser diode 1 has a disk-shaped stem 101 having a larger diameter and a cylindrical case 102 attached to the stem 101 coaxially. A laser diode chip (not shown) is housed in the case 102. An intensity distribution of a laser beam emitted from the laser diode 1 represents a Gaussian distribution and has an ellipsoidal shape 11b having maximum and minimum angles $\theta_v$ and $\theta_h$ in an orthogonal direction as shown in FIG. 5. In general, a region of the light beam situated inside of the aperture 4 shown in FIG. 1B is utilized.

In the embodiment, a device frame 20 for attaching the laser diode 1 is provided with an attachment portion having a structure shown in FIG. 2. Referring to FIG. 2, an attachment portion 21 includes a shallow and rectangular recessed portion 23 formed on an end face 22 of the device frame 20 and a circular hole 24 formed on the center of a bottom face of the recessed portion 23.

A pair of inner peripheral faces 233 and 234 are formed on central portions of longitudinal inner faces 231 and 232 of the recessed portion such that a circular outer peripheral face 103 (see FIG. 3) of the stem 101 of the laser diode 1 can be press-fitted therebetween. Moreover, convex faces 241 and 242 are formed between the inner peripheral faces 233 and 234 and an edge of the circular hole 24, respectively. The convex faces 241 and 242 are more bulged than a bottom face 235 of the recessed portion 23 and a line connecting the centers of the convex faces 241 and 242 is set to be a rocking center line L1 of the laser diode. The rocking center line L1 perpendicularly intersects an optical axis L of the optical system.

The inner peripheral faces 233 and 234 are circular arcs having an angle of approximately 60 degrees around the optical axis of the optical system, and other portions on the inner peripheral face of the recessed portion are provided apart from the laser diode 1.

As shown in FIG. 3, when the laser diode 1 is press-fitted in the attachment portion 21 having such a structure, the circular outer peripheral face 103 of the stem 101 of the laser diode 1 is press-fitted between the inner peripheral faces 233 and 234. Moreover, the laser diode 1 can be press-fitted until an annular end face 104 of the stem 101 of the laser diode comes in contact with the convex faces 241 and 242. In other words, there is an advantage that the convex faces rockably supporting a laser beam source also function as planes for positioning the laser beam source in the optical axis direction.

As a result, the laser diode 1 can be rocked around the center line L1 with the annular end face 104 of the stem supported by a support portion including the convex faces 241 and 242. At the same time, a motion other than the rocking motion is restricted by the inner peripheral faces 233 and 234.

In a state in which the laser diode 1 is press-fitted in the attachment portion 20, the laser diode 1 can be rocked around the center line L1. In the embodiment, a rocking direction is set to be coincident with a direction in which the distribution of the light quantity of the laser beam 11 is the smallest as shown in FIG. 3.

Figure 6A:
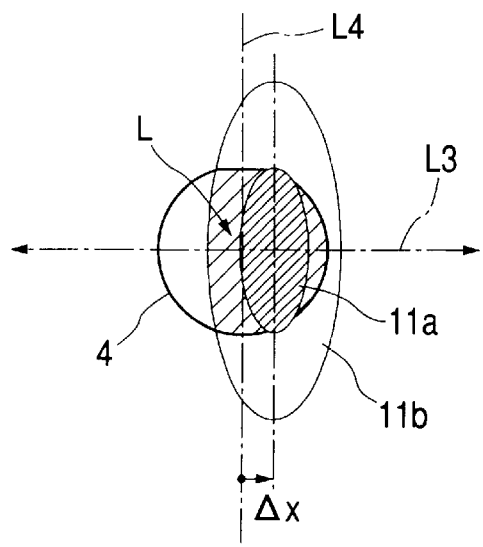
FIG. 6A and 6B are diagrams illustrating the relationship between an aperture for the objective lens and the intensity distribution center of the laser beam.
Figure 6B:
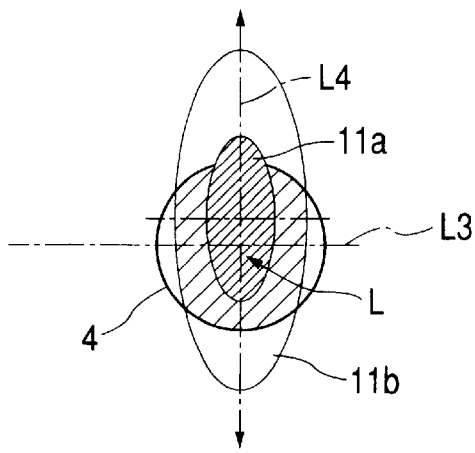

In the embodiment, accordingly, when the laser diode 1 is press-fitted in the attachment portion 20 and is then rocked, the intensity distribution center 11a of the laser beam 11 emitted therefrom can be moved transversely in the direction in which the intensity distribution is the smallest as shown in L3 of FIG. 1. Therefore, for example, if the intensity distribution center 11a of the laser beam 11 is shifted by $\Delta_x$ from the optical axis L of the optical system as shown in FIG. 6A, the laser diode 1 is tilted in one direction so that the intensity distribution center 11a can be coincident with the optical axis L of the optical system. After the laser diode 1 is thus adjusted, it is bonded and fixed to the device frame side with an adhesive in the adjusted state.

In the embodiment, moreover, the rocking center of the laser beam source is very close to a luminescent point thereof. Therefore, there is an advantage that the rocking motion of the laser beam source can prevent the optical axis from being shifted.

While the rocking direction of the laser diode is set to be coincident with the direction in which the distribution of the light quantity of the laser beam emitted from the laser diode is the smallest in the above description, other directions can also be applied.

Although the convex faces 241 and 242 are formed in the above example, they may be convex planes or convex curved faces. Furthermore, convex circular arc faces can also be used. Moreover, the laser diode may have a unit structure in which a hologram element and a light receiving element are integrated.

Furthermore, it is a matter of course that the invention can also be applied to an optical pickup device comprising an optical system having a different structure from that of the optical system described above.

What is claimed is:

1. An optical pickup device comprising:
    a laser light source for emitting a laser beam;
    an optical system for converging the laser beam onto a recording face of an optical recording medium, and for reproducing information recorded on the optical recording medium in accordance with a returning light beam reflected by the recording face, the optical system having a system optical axis;
    a device frame on which the laser light source is mounted, the device frame including:
        a supporting member for supporting the laser light source while allowing the laser light source rocking about a rocking center line which intersects the system optical axis orthogonally; and
        a restricting member for supporting the laser light source while restricting a motion of the laser light source other than the rocking motion, wherein the laser light source is configured to have a cylindrical casing and a circular stem coaxially attached to the cylindrical casing;

wherein the device frame includes a recessed portion into which the laser light source is press-fitted;

wherein the restricting member is provided as part of an inner face of the recessed portion for supplying only parts of an outer periphery of the stem situated on the rocking center line; and wherein the supporting member is provided as convex portions formed on a bottom portion of the restricting member for supporting only parts of an end face of the stem situated on the rocking center line.

2. The optical pickup device as set forth in claim 1, wherein a direction of the rocking motion of the laser light source is set so as to be coincident with a direction at which an intensity distribution of the laser beam emitted from the laser light source becomes most narrow.

3. The optical pickup device as set forth in claim 1, wherein a direction of the rocking motion of the laser light source is set so as to be coincident with a direction at which an intensity distribution of the laser beam emitted from the laser light source becomes most narrow.

* * * * *